United States Patent [19]

Brown et al.

[11] Patent Number: 4,765,134
[45] Date of Patent: Aug. 23, 1988

[54] ACOUSTIC OSCILLATORY PRESSURE CONTROL FOR SOLID PROPELLANT ROCKET

[75] Inventors: Robert S. Brown, Santa Clara; Roger Dunlap, Sunnyvale, both of Calif.

[73] Assignee: United Technologies Corporation, Hartford, Conn.

[21] Appl. No.: 901,117

[22] Filed: Aug. 28, 1986

[51] Int. Cl.$^4$ .............................................. F02K 9/72
[52] U.S. Cl. ........................................ 60/204; 60/253
[58] Field of Search ............... 60/204, 253, 254, 255, 60/256; 102/287, 288, 289, 291, 352, 360, 381

[56] References Cited

U.S. PATENT DOCUMENTS

| 3,315,472 | 4/1967 | Moutet et al. | 60/256 |
| 3,407,736 | 10/1968 | Beuschet | 102/291 |
| 3,656,304 | 4/1972 | McCullough | 60/256 |
| 4,047,483 | 9/1977 | Williams | 60/256 |
| 4,075,832 | 2/1978 | Diesinger et al. | 60/254 |

Primary Examiner—Louis J. Casaregola
Attorney, Agent, or Firm—William J. Sapone

[57] ABSTRACT

The periodic shedding of vortices produced in a highly sheared gas flow, such as that encountered at the grain transition boundary in a solid propellant rocket motor or at the combustor inlet to a ramjet engine, is a significant source of acoustic instability which may result in unstarting of the ramjet engine or excessive vibration of the rocket motor. By restricting the transition boundary or combustor inlet at the sudden expansion dump plane (5), such as by locating an orifice plate (13) at the dump plane, the gas flow is separated upstream and produces a vena contracta downstream of the orifice, inhibiting the feedback of acoustic pressure to the point of flow separation and preventing the formation of organized oscillations. Incorporation of such a simple thin plate orifice at the dump plane reduces the periodic acoustic oscillations and thereby controls the detrimental oscillatory pressure fluctuations.

8 Claims, 3 Drawing Sheets

ACOUSTIC OSCILLATORY PRESSURE CONTROL FOR SOLID PROPELLANT ROCKET

DESCRIPTION

1. Technical Field

This invention relates to solid propellant rocket motors and ramjet engines and more particularly to a method of controlling acoustic oscillatory pressures in the combustor inlet sections of such solid propellant rocket motors and ramjet engines.

2. Background Art

The periodic shedding of vortices produced in highly sheared gas flows has been recognized as a source of substantial acoustic energy for many years. Experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occuring at the grain transition boundary in boost/sustain type tactical solid propellant rocket motors. The resultant pressure oscillations caused by the vortex shedding can lead to excessive thrust oscillations and motor vibrations, having a detrimental effect on performance.

In addition to a segmented solid propellant rocket motor, highly sheared flow separations producing vortex shedding can be generated in a variety of ramjet engines which include sudden flow area expansions, such as those generally found at the dump plane of the combustor inlet sections of coaxial inlet ramjet engines. Periodic vortex shedding could therefore be a significant source of acoustic instability in these types of engines. The oscillatory acoustic pressures generated at the combustor inlet could couple with the acoustic resonances of the inlet shock structure to produce pressure oscillations that result in periodic combustor inlet unstarting, reducing the gas flow through the engine, and detrimentally affecting thrust generation.

DISCLOSURE OF INVENTION

It is an object of the present invention to provide a method for controlling the acoustic oscillatory pressures generated at the transition grain boundaries in a solid propellant rocket motor.

It is a further object of the present invention to provide a method for controlling the acoustic oscillatory pressures generated in the combustor section of a ramjet engine.

It is a further object of the present invention to achieve stabilized flow through either a solid propellant rocket motor or a ramjet engine.

These and other objects of the present invention are achieved by restricting the grain transition boundary or combustor inlet at the sudden expansion geometry, such that the gas flow separates upstream and produces a vena contracta downstream of the restriction, which combine to preclude the formation of acoustic pressure instabilities in the flowing gas stream. Such an inlet restiction also inhibits the feedback of acoustic pressure to the point of upstream gas flow separation, thereby preventing the formation of organized oscillations.

BEST MODE FOR CARRYING OUT THE INVENTION

Figure 1A:
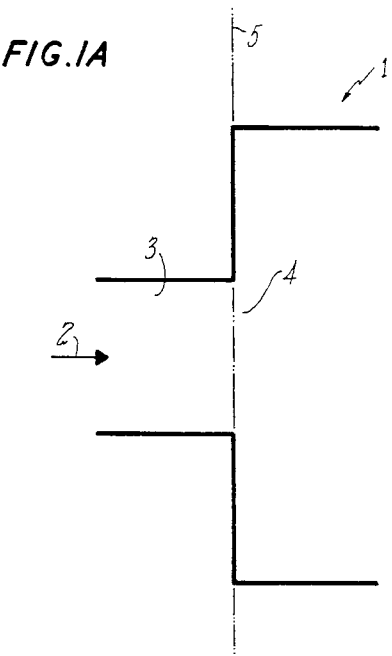
FIG. 1a is a schematic illustration of a typical sudden flow area expansion encountered at a combustor inlet to a ramjet engine or at the grain transition boundary in a solid propellant rocket motor, which does not include the present invention.

Referring to FIG. 1a, a typical sudden expansion flow area 1, such as one found at the combustor inlet of a coaxial inlet ram jet engine, or at the grain transition boundary in a boost/sustain type tactical solid propellant rocket motor, is shown. A gas, represented by an arrow 2, flows from an upstream inlet section 3 into an enlarged downstream section 4, passing through a dump plane 5 which is the point of coaxial expansion. The gas flow then exits through an exhaust nozzle 6 (not shown). In a segmented solid propellant rocket engine, the upstream grain section has a narrow diameter gas path which leads to a downstream grain section having a wide diameter gas path, with a transition boundary therebetween. Such a configuration provides variable thrust at different times during the propellant burn and allows boost/sustain sequencing to be configured in the propellant grain.

EXAMPLE

Figure 2:
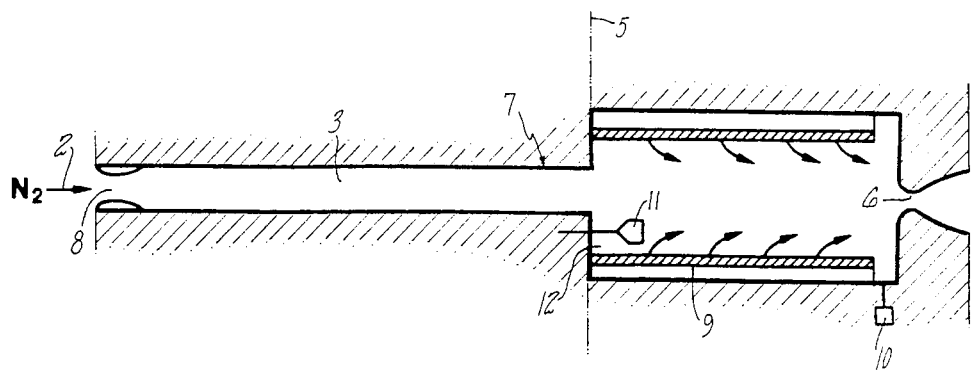
FIG. 2 is a schematic representation of an exemplary cold flow apparatus.

Referring to FIG. 2, a cold-flow apparatus 7 was assembled to simulate the grain transition boundary in a boost/sustain type solid propellant rocket motor as well as to roughly approximate the combustor inlet of a coaxial inlet solid fuel ramjet engine. The inlet section 3 of the apparatus 7 was 5 cm in diameter, with the downstream section having a diameter of about 12 cm. Nitrogen was used as the flowing gas 2 with 33% entering through a choked inlet 8 upstream of the dump plane 5. The remaining gas entered laterally through a 10 cm diameter porous tube 9 disposed in the downstream section 4, downstream of the dump plane 5. A pressure transducer 10 was mounted just upstream of the exhaust nozzle 6 and a single element hot wire anemometer 11 mounted through the dump plane 5 to measure the mean and oscillatory flows in the recirculation zone 12. All tests were performed at 275 kPa (40 psia) measured by the pressure transducer 10 at the entrance plane to the exhaust nozzle 6.

Figure 3:
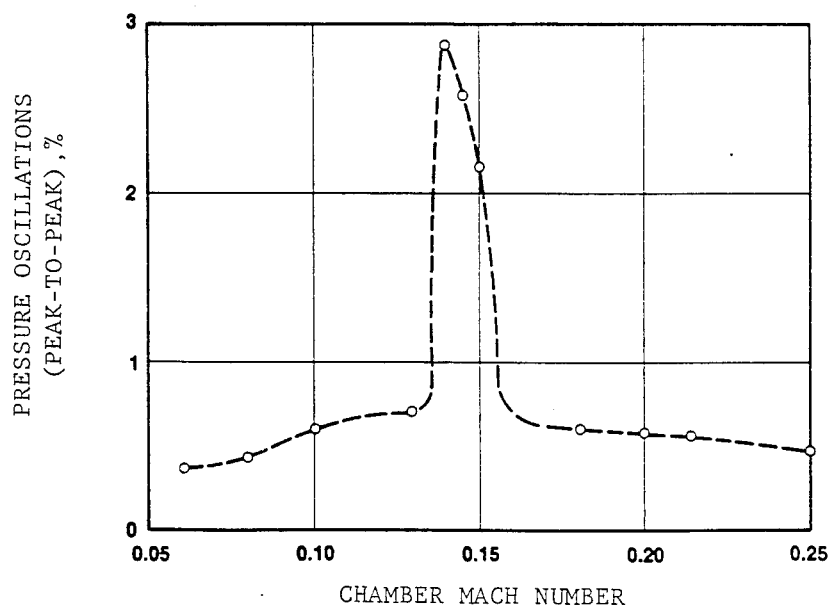
FIG. 3 is a graph illustrating the peak-to-peak pressure oscillations verses chamber Mach number.
Figure 5:
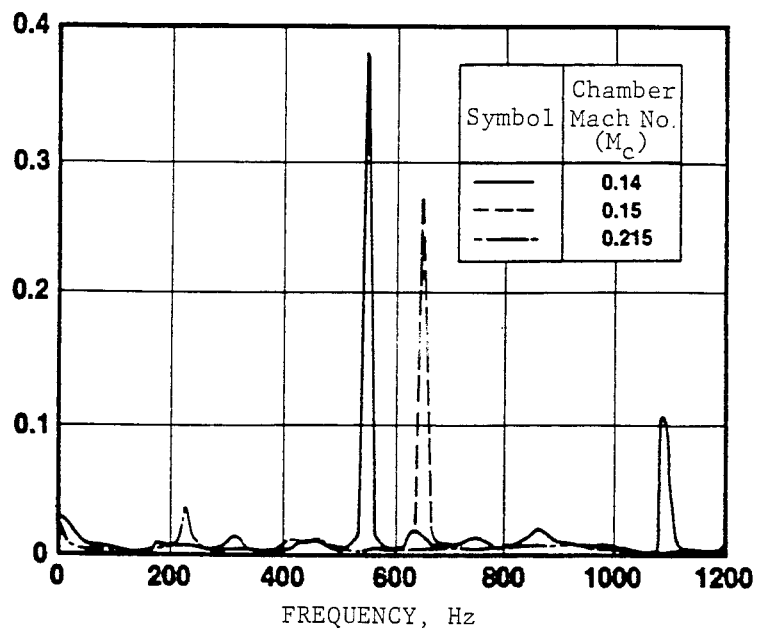
FIG. 5 is a graph showing the frequency spectra of the acoustic pressure for three nozzle entrance Mach numbers, two of which produce significant oscillatory levels.

With flowing nitrogen, it was found that a gas flow rate in the range of Mach 0.14–0.15, produced substantial acoustic pressure increases over a base line dump plane pressure measured at Mach 0.215 (See FIG. 5). FIG. 3 illustrates the peak-to-peak pressure oscillations that occur verses chamber Mach number.

Figure 4:
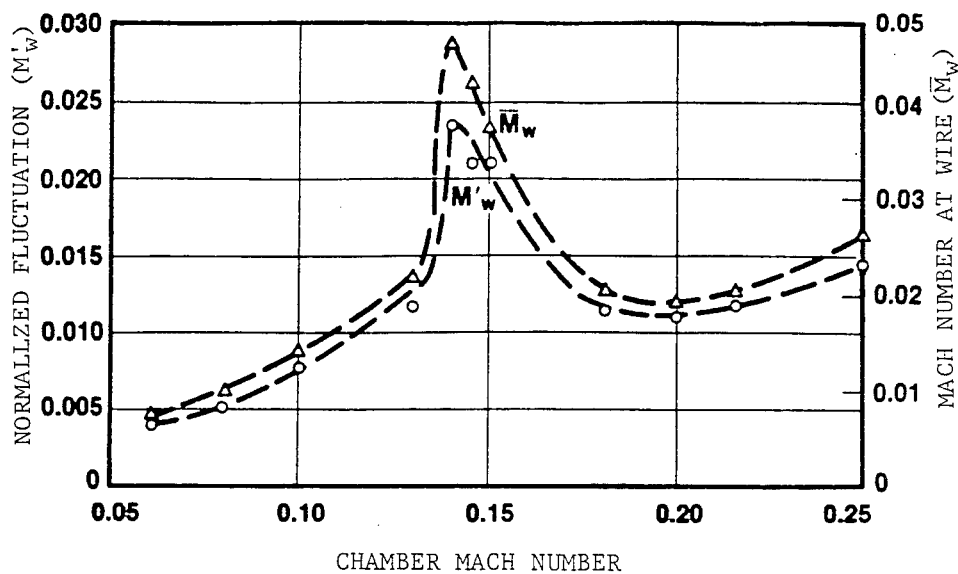
FIG. 4 is a graph illustrating the mean and oscillating velocity versus chamber Mach number.

Referring to FIG. 4, the corresponding mean and oscillatory Mach numbers in the gas recirculation zone are shown, as measured by the hot wire anemometer 11. Both the recirculation Mach numbers maximize at the chamber Mach numbers where the acoustic pressures are also at a maximum, (i.e., Mach 0.14-0.15). The peak and the high mean speed are surprising, yet consistent with the intrusion of the edge of the vortex into the recirculation zone. Thus, this graph indicates that periodic shedding of a vortex structure is a source for the acoustic oscillatory pressures encountered in solid propellant rocket motors and ramjet engines.

Figure 1B:
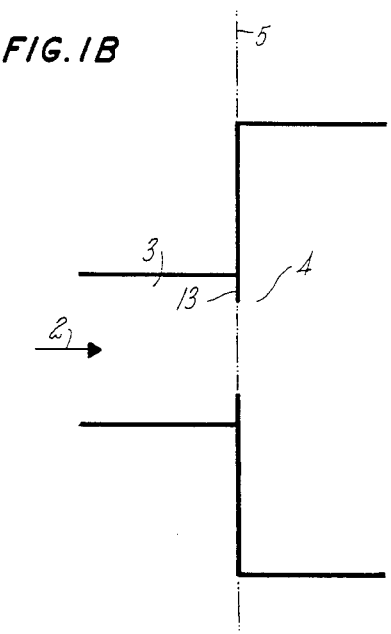
FIG. 1b is an schematic illustration of the preferred embodiment of the present invention which includes an orifice plate located at the critical dump plane.

Referring to FIG. 1b, the preferred embodiment of the restricted dump plane geometry of the present invention is shown. Tests were run using a 4 cm diameter sharp edged orifice plate 13 located at the dump plane 5 of the assembled apparatus 7, thereby providing a throat area ratio of 0.80. The throat area ratio compares the open upstream area (5 cm diameter) to the orifice open area (4 cm diameter). The characteristic Strouhal numbers (based on the two characteristic dimensions; chamber Mach number and 650 HZ) were varied from 0.14-0.78 by varying the exhaust nozzle diameter in increments of 0.02-0.03 centimeters. No conditions producing significant acoustic energy were found.

There is a fundamental difference between the sharp edged orifice and the straight sudden expansion of a typical sudden flow area expansion of a coaxial ramjet engine. While the flow from the sudden expansion separates right at the geometry change and has no vena contracta downstream, the flow through the orifice plate separates upstream and has a vena contracta downstream of the orifice. Such a change in flow characteristics precludes the formation of acoustic instabilities at the dump plane. It is believed that throat area ratios of from 0.50 to 0.95 will be effective in controlling the oscillatory pressures. In addition, location of an orifice at the dump plane inhibits the feedback of acoustic pressure to the point of upstream flow separation and thereby enhances the effectiveness of the orifice in preventing organized oscillations from forming. Therefore, incorporation of a simple thin plate orifice at the combustor inlet of a ramjet engine or at the grain transition boundary of a solid propellant rocket motor eliminates the acoustic oscillations and therefore prevents unstarting of the ramjet engine or excessive motor vibration. This result is surprising and differs from previously reported experience in segmented solid propellant rockets, which showed flow separations from an orifice actually increasing the generation of acoustic energy when impinged on a downstream orifice.

While the preferred embodiment of the present invention has been described in relation to a restriction in the inlet area diameter at the dump plane, it will be understood by those skilled in the art that any change in the inlet section which results in reduced vortex shedding may be made without varying from the scope of the present invention.

Having thus described the invention, what is claimed is:

1. A method for controlling the acoustic oscillatory presssures generated by gas flow at the grain transition boundary in solid propellant rocket motors, said boundary transition including a sudden geometry expansion, said method characterized by;
   restricting the transition boundary at the sudden expansion geometry such that the gas flow separates upstream and has a vena contracta downstream of said restricted transition boundary.

2. The method of claim 1 wherein said restriction is characterized by a reduction in diameter at the sudden expansion geometry.

3. The method of claim 2 wherein an orifice plate is located at said sudden expansion geometry, said orifice plate having a throat area ratio of 0.50 to 0.95.

4. The method of claim 3 wherein said orifice plate has a throat area ratio of 0.80.

5. An apparatus for controlling the acoustic oscillatory pressures generated by gas flow through a solid propellant rocket engine including an upstream grain section, a downstream grain section, and a transition boundary therebetween, said transition boundary including a sudden area expansion into the downstream section, said apparatus characterized by:
   means for restricting said transition boundary at the sudden area expansion such that the gas flow separates upstream and has a vena contracta downstream of said restricted transition boundary.

6. The apparatus of claim 5 wherein said restriction means comprise a sharp edged orifice plate, located at said sudden expansion geometry.

7. The apparatus of claim 6 wherein said orifice plate has a throat area ratio of 0.50 to 0.95.

8. The apparatus of claim 8 wherein said orifice plate has a throat area ratio of 0.80.

* * * * *